(No Model.)
A. AKER.
WHIM.
No. 497,291. Patented May 9, 1893.
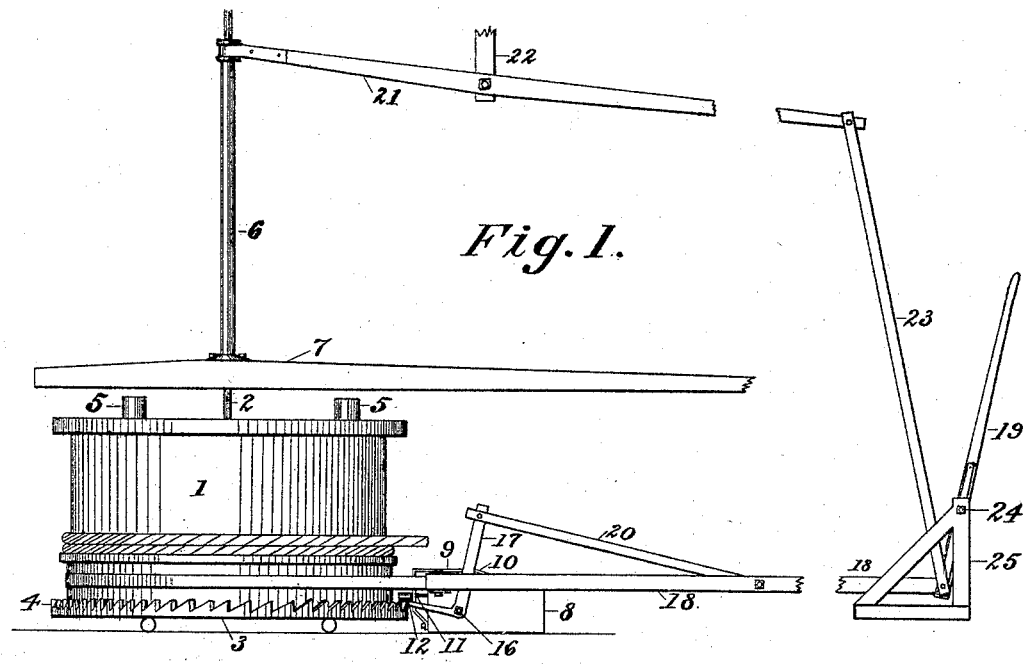
Witnesses.
Charles E Sacpten
John H Harris
Anton Aker, Inventor.
per Edward C Russel
Attorney.

UNITED STATES PATENT OFFICE.

ANTON AKER, OF HELENA, MONTANA.

WHIM.

SPECIFICATION forming part of Letters Patent No. 497,291, dated May 9, 1893.

Application filed June 23, 1892. Serial No. 437,706. (No model.)

*To all whom it may concern:*

Be it known that I, ANTON AKER, a citizen of the United States, and a resident of the city of Helena, county of Lewis and Clarke, State of Montana, have invented a new and useful Improvement in Whims, of which the following is a specification.

In the working and prospecting of mines which are often at great distances from repair shops and foundries, much inconvenience and trouble is occasioned by the breaking of complicated metal parts used in and about the whim, necessitating loss of time and money to replace them. A simple arrangement of parts so that one man can control the horse power and the whim, without loss of time and with safety has also been much needed.

My invention is intended to supply these necessities, by an improved lever, controlling in one movement the horse power and the whim, and made in the simplest manner possible.

It consists of a single lever handle, operating in one movement two sets of levers, attached thereto, one of which throws off the horse power from the whim, and the other of which sets the brake and releases the ratchet, which keeps the whim from slipping back, thus permitting the operator to lower the bucket at his will.

Figure I. shows a perspective view of the whole mechanism. Fig. II. shows a plan of the brake setting and ratchet releasing device. Fig. III. shows a side elevation of ratchet and releasing arm. Fig. IV. shows a side elevation of lever handle and attached levers.

Similar figures refer to similar parts in all the drawings.

The whim, 1, working freely on its upright pivot shaft, 2, has firmly attached to its lower edge a metal rim, 3, with cogs, 4, 4, sloping in a direction opposite to the forward motion of the whim, 1. On the upper face of the whim are four strong projecting pins, 5, 5, set at the corners of a square, well within the circumference of the face.

Revolving upon the upright pivot shaft, 2, is the tube or pipe, 6, to which is attached the power arm 7, which, when the power is in use, rests upon the upper face of the whim, being in contact, on its opposite sides, with two of the pins, 5, diagonally opposite each other.

Firmly attached to the floor or ground, near the base of the whim, 1, is the block 8, to the upper surface of which is firmly attached the metal strap, 9, having the raised arch or bridge, 10. The inner end of this strap, 9, is secured to the block, 8, by the bolt, 11, on which works freely the pawl, 12, which works in the cogs, 4, 4, and by the bolt 26. Passing under this arch, 10, and working freely on the pivot bolt, 13, is the lever, 14, formed of the upper bar, $14^a$, and the lower bar, $14^b$, bolted together by the bolts, $14^c$, $14^d$, and $14^e$.

Attached to, but working freely on the bolt, $14^c$, at the end of the short arm of the lever, 14, is one end of the brake strap, 15, which passes around the whim, 1, and is attached in turn to the bolt, $14^d$, which is the same distance from the pivot bolt, 13, as is the bolt, $14^c$. Working freely on the bolt, 16, in the block, 8, is the rectangular lever, 17, the short arm of which projects under the free end of the pawl, 12. Attached to the long arm of the lever, 14, by the bolt, $14^d$, on which it works freely, is the bar, 18, running beyond the sweep of the power arm, 7, and attached at its other end to the lower end of the hand lever, 19. The lever, 17, is attached to this bar, 18, by the connecting rod, 20, working freely at its connections. The end of the short arm of the long lever, 21, is connected by a swivel joint with the upper end of the pipe, 6. This lever is suspended at its fulcrum point by the supporting rod, 22, attached to an overhead frame, and is long enough to reach beyond the sweep of the power arm, 7, and is connected by the rod, 23, with the lower end of the hand lever, 19. The hand lever, 19, works upon the bolt, 24, in the supporting frame, 25.

The mode of operation is as follows: Starting with the power lever, 7, in use, resting upon the face of the whim, 1, and pressing against two of the pins, 5, the whim turns, the brake strap, 15, is relaxed and the safety pawl 12, slips freely over the cogs, 4, 4. When the bucket reaches the top of the shaft, or the unloading point the hand lever, 19, is pushed forward, the power arm, 7, is raised from the whim above the pins, 5, the brake strap, 15, is tightened and the pawl, 12, is raised from the cogs. The operator can then lower the bucket again at his will, by relaxing the brake strap, 15.

Having thus described my invention, what I claim as new, and desire to secure by Letters Patent, is—

1. In a horse power whim, the hand lever 19, the bar 18 attached thereto, the connecting rod 20, jointed to the bar 18 and to the lever 17, the bent lever 17, acting on the pawl 12, the pawl 12, the brake lever 14, jointed to the bar 18, and the brake strap 15, attached to the lever 14, all substantially as shown and described.

2. In a horse power whim, the hand lever 19, the rod 23, jointed thereto, the lever 21, operated by the rod 23, the tube 6, connected with the lever 21, the power arm 7 attached to the tube 6; the rod 18, operated by the lever 19, the brake lever 14, connected with the rod 18, the brake strap 15 attached to the brake lever 14, the rod 20, connecting the lever 17, with the rod 18, the bent lever 17, and the pawl 12, operated by said lever 17, all substantially as shown and described.

In testimony that I claim the foregoing as my invention I have signed my name, in presence of two witnesses, this 6th day of May, 1892.

ANTON AKER.

Witnesses:
JACOB WAGNER,
EDWARD C. RUSSELL.